Figure 1:
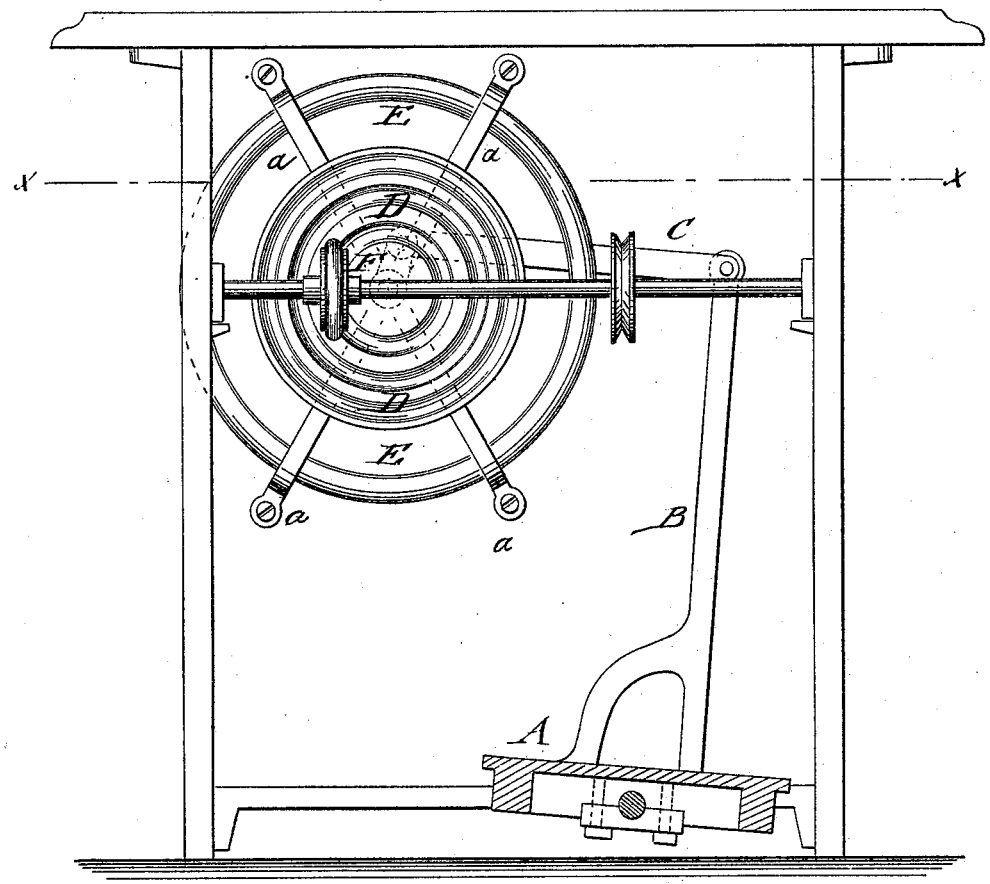
Figure 2:
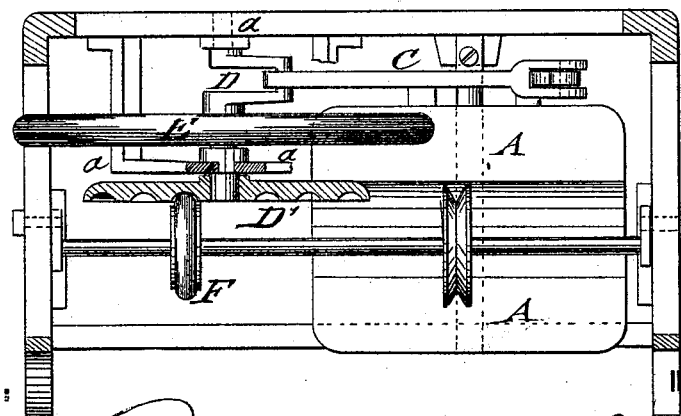

J. A. BOWER.
HAY-LOADER.
No. 171,647. Patented Jan. 4, 1876.
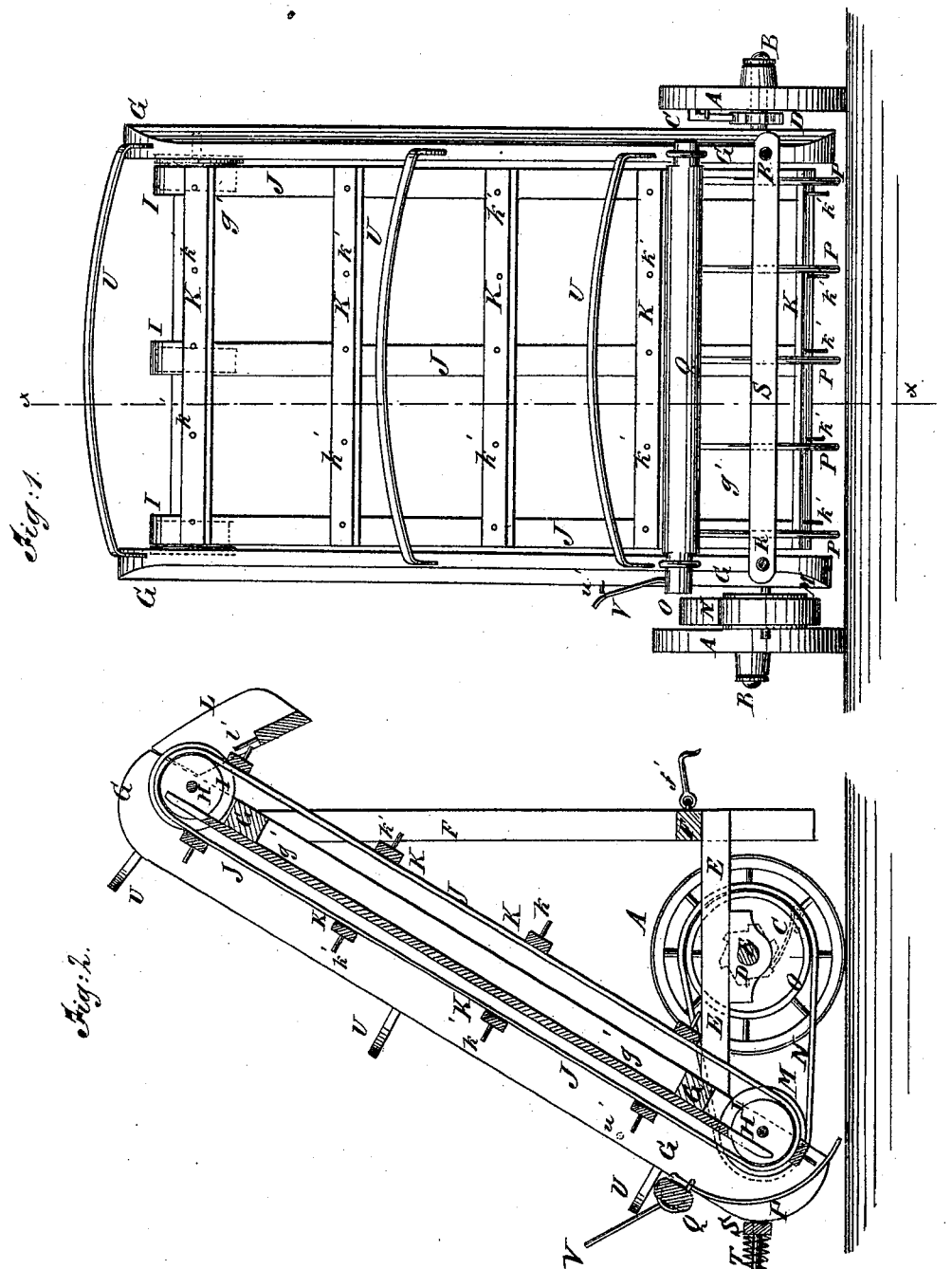

C. BRANDTNER.
TREADLES.

No. 171,648. Patented Jan. 4, 1876.

WITNESSES:
Chas. Nida
Alex F. Roberts

INVENTOR:
C. Brandtner
BY
Munn & Co.
ATTORNEYS.